(12) United States Patent
Douglas et al.

(10) Patent No.: US 12,374,901 B2
(45) Date of Patent: Jul. 29, 2025

(54) TOOL-AGNOSTIC DEVICE

(71) Applicant: Lowe's Companies, Inc., Mooresville, NC (US)

(72) Inventors: Jonothon Frederick Douglas, Kirkland, WA (US); Paul Michael Sisneros, Kirkland, WA (US)

(73) Assignee: Lowe's Companies, Inc., Mooresville, NC (US)

( * ) Notice: Subject to any disclaimer, the term of this patent is extended or adjusted under 35 U.S.C. 154(b) by 130 days.

(21) Appl. No.: 17/342,352

(22) Filed: Jun. 8, 2021

(65) Prior Publication Data

US 2021/0384741 A1 Dec. 9, 2021

Related U.S. Application Data

(60) Provisional application No. 63/036,783, filed on Jun. 9, 2020.

(51) Int. Cl.
*H02J 7/00* (2006.01)
*B23B 45/02* (2006.01)
*B25F 5/00* (2006.01)

(52) U.S. Cl.
CPC .......... *H02J 7/00034* (2020.01); *B23B 45/02* (2013.01); *B25F 5/00* (2013.01); *H02J 7/0044* (2013.01)

(58) Field of Classification Search
CPC ................ H02J 7/00034; H02J 7/0044; H02J 13/00002; H02J 13/00022; B23B 45/02; B23B 49/00; B23B 2260/024; B23B 2260/128; B25F 5/00; B23Q 17/00; G01S 5/0027; H04W 4/80; H04W 4/029; Y10T 408/172
See application file for complete search history.

(56) References Cited

U.S. PATENT DOCUMENTS

| | | | |
|---|---|---|---|
| 7,182,148 B1 * | 2/2007 | Szieff ................... | B25H 1/0078 173/171 |
| 11,103,980 B2 * | 8/2021 | Tang ..................... | B25B 21/008 |

(Continued)

OTHER PUBLICATIONS

PCT/US2021/036289, "International Preliminary Report on Patentability", Dec. 22, 2022, 8 pages.

(Continued)

*Primary Examiner* — Adnan Aziz
(74) *Attorney, Agent, or Firm* — Kilpatrick Townsend & Stockton LLP (57) ABSTRACT

Described herein are a system and methods for implementing a tool-agnostic device. In examples, the system may determine location and state information using sensors of the tool-agnostic device. Based on this information, the system may communicate with a virtual reality system for display and user interaction with a virtual reality environment. The tool-agnostic device may be removed and re-attached to a number of different tools. The tool-agnostic device allows tracking of a number of different tools without customization or retrofitting each tool. The tool-agnostic device may serve as a safety-shutoff device in addition to tracking tool use and movement. When the system determines that a tool is operating in an unsafe manner the tool-agnostic device may interrupt the power to the tool.

20 Claims, 6 Drawing Sheets

(56) References Cited

U.S. PATENT DOCUMENTS

| | | | |
|---|---|---|---|
| 2002/0033267 A1* | 3/2002 | Schweizer | B25B 23/14 173/2 |
| 2013/0109375 A1 | 5/2013 | Zeiler et al. | |
| 2013/0137079 A1* | 5/2013 | Kahle | G01S 19/45 434/365 |
| 2013/0138465 A1* | 5/2013 | Kahle | G06Q 10/063114 705/7.17 |
| 2014/0070924 A1* | 3/2014 | Wenger | B25F 5/00 340/10.1 |
| 2014/0159919 A1 | 6/2014 | Furui et al. | |
| 2014/0166323 A1 | 6/2014 | Cooper | |
| 2014/0184397 A1* | 7/2014 | Volpert | G05B 19/05 340/12.51 |
| 2014/0359540 A1* | 12/2014 | Kelsey | G06F 3/017 715/863 |
| 2015/0316913 A1* | 11/2015 | Rickey | B25F 5/00 700/180 |
| 2016/0054721 A1 | 2/2016 | Öberg | |
| 2016/0180602 A1 | 6/2016 | Fuchs | |
| 2016/0311094 A1* | 10/2016 | Mergener | B23B 47/00 |
| 2016/0372939 A1* | 12/2016 | Roehm | B25F 5/00 |
| 2018/0071907 A1* | 3/2018 | Myhill | B25F 5/00 |
| 2018/0096530 A1* | 4/2018 | Greenhalgh | B25B 13/461 |
| 2018/0126507 A1* | 5/2018 | Rivers | B23Q 11/006 |
| 2019/0027002 A1* | 1/2019 | Esenwein | H04W 4/021 |
| 2019/0097668 A1* | 3/2019 | Nicolaidis | H04W 4/029 |
| 2019/0196438 A1* | 6/2019 | Rivers | G05B 19/401 |
| 2019/0221086 A1 | 7/2019 | Cruz-Hernandez et al. | |
| 2019/0222957 A1 | 7/2019 | Burch et al. | |
| 2019/0227528 A1* | 7/2019 | Abbott | G05B 13/0265 |
| 2020/0227927 A1* | 7/2020 | Thiele | H02J 7/0048 |
| 2021/0121967 A1* | 4/2021 | Vetter | B23B 45/003 |
| 2021/0158587 A1* | 5/2021 | Marchand | G06F 9/453 |
| 2021/0192099 A1* | 6/2021 | Benromano | G06Q 10/06 |
| 2021/0205976 A1* | 7/2021 | Matei | G08B 7/06 |
| 2021/0240145 A1* | 8/2021 | Abbott | B25F 5/00 |
| 2021/0241926 A1* | 8/2021 | Chor | H04L 43/04 |
| 2021/0327304 A1* | 10/2021 | Buras | G06F 3/016 |
| 2021/0378768 A1* | 12/2021 | Olson | G06T 19/006 |
| 2022/0265355 A1* | 8/2022 | Ferrante | A61B 34/10 |

OTHER PUBLICATIONS

PCT/US2021/036293, "International Preliminary Report on Patentability", Dec. 22, 2022, 7 pages.

U.S. Appl. No. 17/342,352, "U.S. Patent Application No.", Tool-Agnostic Device, filed Jun. 8, 2021, 13 pages.

Application No. PCT/US2021/036289, International Search Report and Written Opinion, Mailed On Sep. 15, 2021, 9 pages.

Application No. PCT/US2021/036293, International Search Report and Written Opinion, Mailed On Sep. 15, 2021, 8 pages.

U.S. Appl. No. 63/036,783, filed Jun. 9, 2020, titled: "Tool-Agnostic Device".

U.S. Appl. No. 63/037,300, filed Jun. 10, 2020, titled: "Tool-Agnostic Device".

U.S. Appl. No. 17/342,411, filed Jun. 8, 2021, titled: "Tool-Agnostic Device".

U.S. Appl. No. 17/342,411, "Non-Final Office Action", Mar. 30, 2023, 16 pages.

U.S. Appl. No. 17/342,411, "Final Office Action", Aug. 3, 2023, 19 pages.

* cited by examiner

TOOL-AGNOSTIC DEVICE

CROSS-REFERENCES TO RELATED APPLICATIONS

This application claims the benefit of U.S. Provisional Patent Application No. 63/036,783, filed Jun. 9, 2020, the entire contents of which are hereby incorporated by reference for all purposes in its entirety. This application is related to U.S. Provisional Application No. 63/037,300, filed Jun. 10, 2020, which is herein incorporated by reference in its entirety for all purposes.

BACKGROUND

Handheld tools, such as power tools, require power sources and therefore some have cords to plug into electrical outlets while some use interchangeable rechargeable batteries. The interchangeable batteries match a battery port on the various power tools they are configured to interface with. Some examples of handheld tools include drill motors, routers, circular saws, jig saws, and other portable power tools. Training on the use of many power tools can help a user learn to operate such tools more safely and more effectively.

SUMMARY

Techniques and devices described herein are directed to tracking and collecting data relating to handheld tools. Systems herein utilize a tool-agnostic device that may employ one or more sensors for tracking state, type, position, and/or orientation of a tool. Computational devices or servers can process data gathered by the sensors of the tool-agnostic device. As used herein, "tool-agnostic" device means a device designed to be compatible with a variety of different handheld tools, in other words, a device that is not tool-type or design specific. The tool-agnostic device described herein is connectible to multiple different tools. The tool-agnostic device can connect to a handheld tool regardless of a tool type or style.

In some examples, the disclosure is directed to a method of tracking information, such as a position or state, related to a tool using a tool-agnostic device. The position of a tool can include a location and/or a pose or orientation of the tool. Various sensors and data gathering devices may collect an array of information about a position of the tool. Additional sensors can be used to track state of the tool, such as operating parameters of the tool. Methods disclosed herein may include processing, by modules on a computing device, the data from the sensors for a number of purposes. In some examples, the processed data may be conveyed to a virtual reality (VR) or augmented reality (AR) system for integration with the environment displayed to the user.

In some examples, the tool-agnostic device described herein may be configured to install between a portable handheld tool and a removable battery for the tool. In such examples, the tool-agnostic device inserts into a battery port of the portable handheld tool. The tool-agnostic device may also have a port designed to interface with the removable battery of the handheld tool and thereby electrically connect the removable battery to the handheld tool body.

In some examples, the tool-agnostic device may be configured to operate as a safety shutoff device. The tool-agnostic device may contain state sensors configured to measure a state of the portable handheld tool, for example handheld tool parameters such as current draw, motor speed, tool type, tool orientation, tool position, and acceleration. A module may determine, based upon the sensed state information, whether the handheld tool is operating in a safe or an unsafe manner. When the module determines that the tool is operating in an unsafe manner or unsafe condition, the module may instruct the tool-agnostic device to electrically disconnect the battery from the handheld tool to shut down the handheld tool. For example, a handheld router or grinder can include an on-switch or power button that does not require constant pressure to keep the router or grinder running. If the router or grinder is dropped, knocked over, or accidentally turned on, then accelerometers within the tool-agnostic device will sense movement of the tool. Using the data gathered by the sensors, the module may determine that the router is not being operated by a user and send a signal to disconnect power to the router motor.

In the following description, various examples will be described. For purposes of explanation, specific configurations and details are set forth in order to provide a thorough understanding of the examples. However, it will also be apparent to one skilled in the art that the examples may be practiced without the specific details. Furthermore, well-known features may be omitted or simplified in order not to obscure the example being described. but this description is not necessarily intended to limit the scope of future claims. The subject matter to be claimed may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described. The illustrative examples are given to introduce the reader to the general subject matter discussed herein and not intended to limit the scope of the disclosed concepts. The following sections describe various additional examples and examples with reference to the drawings in which like numerals indicate like elements and directional description are used to describe illustrative examples but, like the illustrative examples, should not be used to limit the present disclosure.

BRIEF DESCRIPTION OF THE DRAWINGS

Various examples in accordance with the present disclosure will be described with reference to the drawings, in which.

DETAILED DESCRIPTION

Examples of the present disclosure relate to a device capable of providing information for various handheld power tools. Specifically, the present disclosure relates to a tool-agnostic device that attaches to any of a number of handheld tools, and methods performed with respect to the tool-agnostic device. In some examples, the tool-agnostic device includes sensors for gathering data relating to the position (e.g., location, orientation), and/or state of a handheld tool. As used herein, "state" means operation, use, settings (such as speed settings or forward/reverse), or other non-position or tool identification information for a handheld tool. In some embodiments, the state of a handheld tool may refer to a current amount of power being used by the tool. The state and the location data, as well as other data described herein may also be usage data related to the use of the handheld tool. Because the tool-agnostic device can be attached to multiple different handheld tools, the tool-agnostic device does not have to be integrated into a particular tool. Instead, the tool-agnostic device can be attached to, and detached from, any number of different handheld tools. The tool-agnostic device is configured to collect information that is interpreted in a manner specific to a particular type of handheld tool. This feature allows a consumer to buy a single tool-agnostic device to be used with multiple handheld tools, and does not require manufacturers to integrate the sensors of the tool-agnostic device into each handheld tool. Integration of the sensors and electronics to individual, handheld tool housings may be cost prohibitive. Thus, the tool-agnostic device enables gathering of data and use of sensors without additional tool cost and/or customization and by a party which is not necessarily associated with the manufacturer of the tool. In addition, by utilizing a single device for multiple tools, a user does not have to upgrade tools to utilize the tool-agnostic device.

Some examples described below relate to virtual reality uses of the tool-agnostic device. Virtual reality (VR) is an interactive computer-generated experience taking place within a partially or completely simulated environment. In a VR system example, an image of the handheld tool can be presented on the immersive content presentation system, along with information from the tool-agnostic device. For example, the location and orientation information from the tool-agnostic device can be used to properly orient the handheld tool on the display. Augmented reality (AR) systems may also be considered a form of VR that layers virtual information over a live camera feed into a headset or through a smartphone or tablet device giving the user the ability to view three-dimensional images. For example, an AR user may wear a device, such as AR goggles, through which or upon which the user may see images of the real world compiled with objects or other virtual information projected on top of the real world objects seen through the goggles. In an AR system example, a user views the actual tool through AR goggles, and information about the handheld tool, provided by the tool-agnostic device, is presented on the viewing field of the goggles. As described herein, the immersive content presentation system used with the tool-agnostic device may be referred to as simply a "virtual reality system" or "VR system." As described herein, references to "VR systems" are intended to encompass AR systems or other similar virtual or partially virtual environments. VR systems provide opportunities for training, troubleshooting, or other teaching in a safe and controlled environment. However, costs associated with building compatible devices and tools for the training remain prohibitively high and customization of devices presents additional issues such as consistency.

Figure 1:
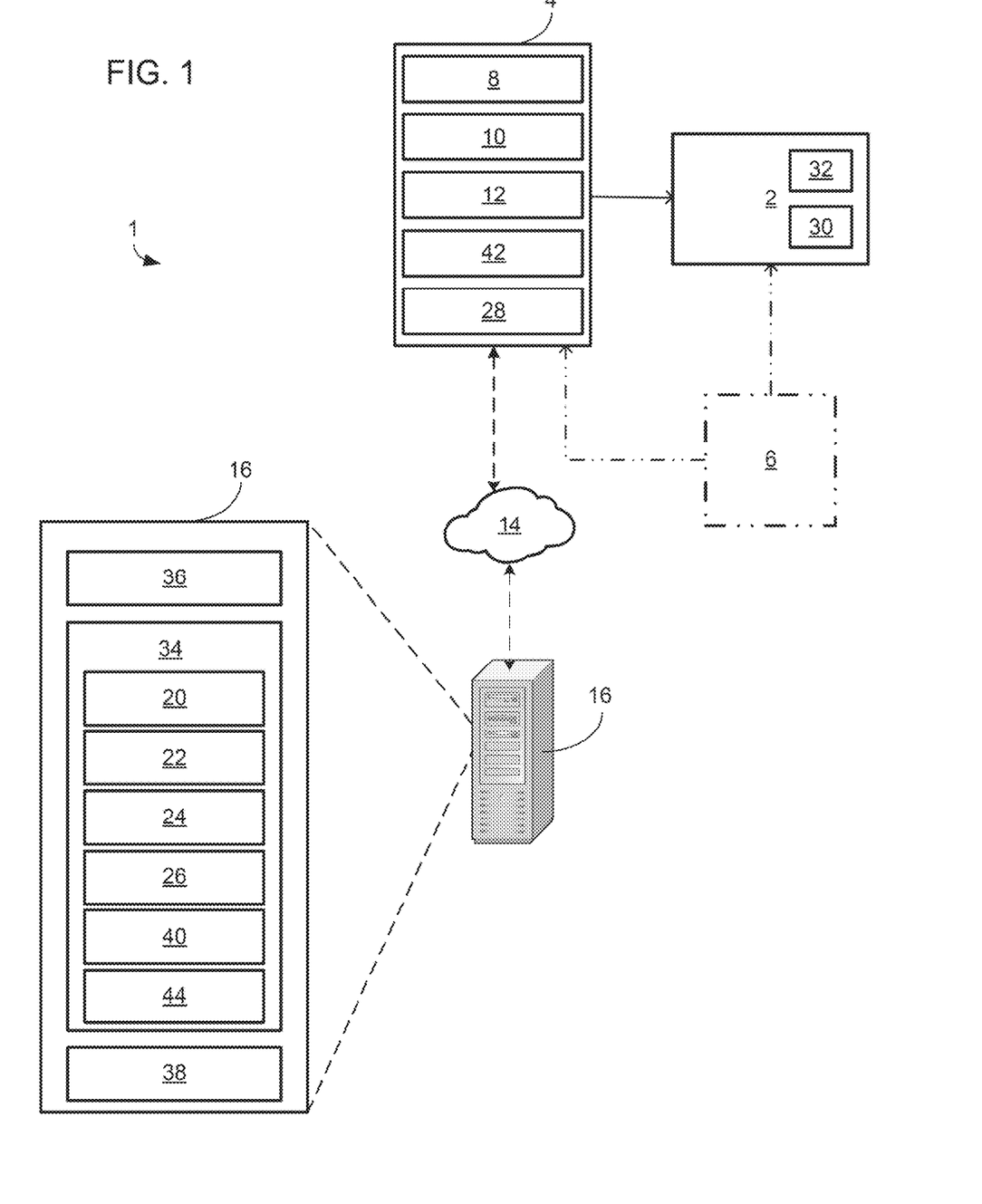
FIG. 1 depicts an illustration of a block diagram for a system that includes a tool-agnostic device in accordance with aspects of the disclosure.

Turning now to the figures, FIG. 1 depicts an illustration of a block diagram for a system that includes a tool-agnostic device 4 in accordance with aspects of the disclosure. The system 1 includes a handheld tool 2, a tool-agnostic device 4, a removable battery 6, a computing device 16, and a network 14. The handheld tool 2 may be any type of portable handheld tool designed to be operated by a person and may draw an electrical current for power. Some non-limiting examples of such handheld tools include drill motors, circular saws, jig saws, portable band saws, routers, rotary grinders, alligator shears, rotary sanders, belt sanders, or any other suitable tool. The handheld tool 2 may be battery operated, with a removable battery and/or may have an electrical power cord for a power source.

In some embodiments, the tool-agnostic device 4 is removably attachable to multiple different types of handheld tools. The tool-agnostic device 4 may connect to the handheld tool 2 in any number of ways, with just one example being to the battery port of the handheld tool 2. In other examples the tool-agnostic device 4 may connect directly to an outer surface or housing of the handheld tool 2. For example, the tool-agnostic device 4 may be shaped to attach to a hand grip of a handheld tool 2.

In some embodiments, the tool-agnostic device 4 may connect to the handheld tool 2 at or through a battery port. The tool-agnostic device 4 may be inserted in or otherwise engage a battery port of a handheld tool 2, and have a port configured to accept or otherwise engage a removable battery 6. In these embodiments, the tool-agnostic device 4 may electrically connect the removable battery 6 to the handheld tool 2 when assembled together, and may be configured to obtain electricity usage information for the handheld tool. In some other examples, the tool-agnostic device 4 includes sensors to measure an electrical current through a handheld tool power cord and attaches to the handheld tool 2 in a location beside a battery port. Such current information can be provided to a state module 12 as described below.

The tool-agnostic device 4 may include any number of sensors. In the example shown in FIG. 1, the tool-agnostic device 4 includes a location sensor 8, an orientation sensor 10, a state sensor 12, and a tool-type sensor 42. The location sensor 8 (which may be a global positioning system (GPS) sensor or other suitable sensor) senses or provides information relating to a location of the tool-agnostic device and/or the handheld tool, such as GPS data, coordinates, and/or a position relative to other objects. The orientation sensor 10 (which may be a gyroscope sensor or other suitable sensor) senses an orientation in space of the tool-agnostic device and/or the handheld tool. The state sensor 12 provides data or information relating to the use, power consumption, settings, operating conditions, or any other non-position or non-orientation data of the handheld tool. The tool-type sensor 42 (which may be a radio frequency identifier (RFID) reader, a machine-readable code reader, or any other suitable sensor) senses and/or provides information related to a handheld tool identification. Each sensor of the tool-agnostic device may include one or more sensing devices and circuitry. In some examples, a single sensor may comprise multiple of the described sensors. For example, a single sensor may obtain and provide information described with respect to both the location sensor 8 and the orientation sensor 10 of the handheld tool 2.

Some non-limiting examples of location sensors 8 include GPS devices, proximity sensors, Bluetooth beacons, magnetic position sensors, optical sensors, hall effect sensors, and acoustic sensors. As would be recognized by one skilled in the art, GPS devices may provide location data by triangulating the handheld tool using electromagnetic signals based on multiple satellite signals or cellular tower signals. Proximity sensors detect the presence of nearby objects, often through the use of electromagnetic fields or beams. Magnetic position sensors or magnetic positioning uses magnetic sensor data to locate the handheld tool based on iron in the surrounding environment and structure. Bluetooth beacons or wireless based positioning systems measures the intensity of a received signal from one or more wireless or Bluetooth beacons or wireless access points. Optical sensors, such as cameras, may use collections of snapshots and build a database of images useful for estimating location in a venue based on images captured by the camera or optical sensor. Acoustic sensors may determine a location based on the volume or strength of acoustic signals from acoustic sources located in a space.

Some non-limiting examples of orientation sensors 10 may include inclinometers, gyroscope sensors, and tilt switches. Inclinometers measure a slope or inclination of an object with respect to gravity's direction through the use of pendulums, spirit levels, liquid capacitive levels, and accelerometers to measure relative differences or directional gravitational forces. Some examples may implement a two-axis digital inclinometer using microelectromechanical tilt sensors for simultaneous two-dimensional angle readings of a plane tangent to earth. Tilt switches rely on conductive fluids and electrical contacts which the conductive fluids contact when tilted or oriented in particular orientations or directions.

Some non-limiting examples of state sensors 12 include current sensors, motion sensors, accelerometers, magnetic position sensors, piezoelectric vibration sensors, shock sensors, piezoelectric film sensors, pressure sensors, temperature sensors, and magnetic angular sensors. A current sensor is a transducer that varies its output based on detection of a magnetic field resulting from the electric current. Motion sensors use accelerometers to detect motion of the sensors or the handheld device. Magnetic position sensors and magnetic angular sensors use hall effect sensors which vary an output voltage in response to a magnetic field. Piezoelectric vibration sensors and film sensors generate voltage when deformed by pressure or acceleration. Shock sensors are sometimes binary outputs which indicate whether a physical shock has occurred and typically use accelerometers and associated microelectromechanical systems. Pressure sensors typically have a diaphragm which is affected by a pressure change or difference and results in a voltage output using a piezoelectric or other transducer.

Some non-limiting examples of tool-type sensors 42 include RFID readers and optical code readers. RFID readers use electromagnetic fields to identify information from tags (i.e., RFID tags) containing electronically-stored information. Optical code readers, such as barcode scanners use photosensors to read barcodes or other optical-based machine-readable codes.

Some implementations of the disclosure may include additional sensors 30 configured to attach or secure to the handheld tool 2 separate from the tool-agnostic device 4. The additional sensors 30 may sense handheld tool settings such as a rotation direction, a speed selection, implementation of a safety device, or other settings on the handheld tool 2. In such implementations, the tool-agnostic device 4 may receive data from the additional sensors 30 for combining with data from the sensors 8, 10, 12, 42 within the tool-agnostic device 4 for processing by the modules 20, 22, 24, 26, and 40 described below. The additional sensors 30 may be included as part of a kit or package intended to outfit a set of handheld tools with full-functionality in a VR environment. The additional sensors 30 may be configured to attach to an outside of the handheld tool 2. In other implementations, the additional sensors 30 may be configured to insert or attach to an inside or internal portion of the handheld tool 2 so as to not interfere with use of the tool and to remain unseen and maintain an unmodified appearance for the handheld tool 2.

In some implementations, the tool-agnostic device 4 may include or incorporate a tool-type sensor 42. The tool-type sensor 42 may be configured to detect information about the type of handheld tool 2 the tool-agnostic device 4 is installed on, and may provide that information to the computing device 16. In some embodiments, the tool-type sensor 42 may read an identification tag 32 on the handheld tool 2 as described below. In some embodiments, the tool-type sensor 42 may utilize user input of a user-selectable option from a digital catalog either stored locally in the tool-agnostic device 4 or stored remotely in a computer system (not shown) in communication with the tool-agnostic device system. For example, when the tool-agnostic device 4 is used with a VR system, the user may select, as part of a setup process, the type of tool being used. Other user inputs are encompassed, such as capturing an image of the tool using an image capture device which is then processed by an object recognition device or technique to identify a tool-type for use. In some embodiments, the tool-type sensor 42 may be activated to obtain tool-type information each time that the tool-agnostic device is attached to a tool. For example, the tool-type sensor 42 may comprise an RFID reader that obtains identification information when it is placed in proximity of an RFID tag. In some embodiments, the tool-type sensor 42 may be activated to obtain tool-type information each time that the handheld tool is powered on. For example, the tool-type sensor 42 may comprise an optical code reader that scans a machine-readable code and obtains identification information when it detects current flowing from the battery to the handheld tool.

Some examples of the tool-type sensor 42 may include a reader on the tool-agnostic device 4 that reads information from an identification tag 32 such as an RFID tag, optical code, or other unique identifiers which are attached or otherwise associated with the handheld tool 2. When the tool-agnostic device 4 is to be connected to the handheld tool 2 the reader can be configured to read the identification tag 32 and thereby know what kind, type, or model of handheld tool 2 it is attached to for data interpretation purposes. In some embodiments, an identifier for a handheld tool may be a serial number and a corresponding identification tag 32 may comprise a barcode that, when scanned, includes the serial number. In these embodiments, the tool-type sensor 42, which may be an optical code reader, may be positioned to read the barcode placed on the handheld tool. An identification tag 32 may be placed upon the handheld tool by a manufacturer of the handheld tool, or by another entity.

It should be noted that some embodiments of the disclosure may not include a tool-type sensor 42. In some embodiments, the tool-type module 40, described below, may be configured to automatically identify a type of the handheld tool based on data gathered by one or more sensors 8, 10, 12, or 42. For example, the tool-type module 40 may identify the tool-type based on the profile of the data gathered. Different types of tools, drills, saws, routers, etc. will have different operating needs and unique sensor data profiles which the tool-type module 40 may identify and use to determine which tool the tool-agnostic device 4 is attached to. For example, a tool-type module 40 may be configured to identify a sensor data profile from sensor output provided to the tool-type module 40. In this example, the tool-type module 40 may then compare the identified sensor data profile to sensor data profiles stored in relation to known tool types.

The tool-agnostic device 4 also may include a transmitter 28 designed to communicate with a network 14 and/or a computing device 16. The tool-agnostic device 4 can connect to separate devices through the network 14. For example, the network 14 may include an open network, such as the internet, personal area network, local area network (LAN), campus area network (CAN), metropolitan area network (MAN), wide area network (WAN), wireless local area network (WLAN), a private network, such as an intranet, extranet, or other backbone. In some instances, the tool-agnostic device 4 may also be configured for short-range communication over short-range communication channels, such as Bluetooth or Bluetooth Low Energy channel. Communicating using a short-range communication such as BLE channel can provide advantages such as consuming less power, being able to communicate across moderate distances, being able to detect levels of proximity, achieving high-level security based on encryption and short ranges, and not requiring pairing for inter-device communications. In some implementations, gateways (e.g., Wi-Fi access point) can be used to exchange communications between the tool-agnostic device 4 and other devices. Communications between two or more systems and/or devices can be achieved by a secure communications protocol, such as secure sockets layer (SSL), transport layer security (TLS). In addition, data and/or transactional details may be encrypted based on any convenient, known, or to be developed manner, such as, but not limited to, DES, Triple DES, RSA, Blowfish, Advanced Encryption Standard (AES), CAST-128, CAST-256, Decorrelated Fast Cipher (DFC), Tiny Encryption Algorithm (TEA), eXtended TEA (XTEA), Corrected Block TEA (XXTEA), and/or Rivest Cipher 5 (RC5), etc.

The computing device 16 may additionally include one or more processor(s) 36 and memory 34, configured to collect, store, process, or direct communication of information and data gathered by the tool-agnostic device 4. Although shown as being in communication with the tool-agnostic device 4 through the network 14, in some implementations, features of the computing device 16 may be mounted within or on the housing of the tool-agnostic device. In other implementations, the tool-agnostic device 4 may only collect and convey data to the computing device 16 over the network 14 for processing and implementation according to any of the methods described herein.

The computing device 16 may be any type of computing device such as, but not limited to, a mobile phone, a smart phone, a personal digital assistant (PDA), a laptop computer, a desktop computer, a server computer, a thin-client device, a tablet PC, etc. Additionally, it should be noted that in some examples, the computing device 16 may be executed by one or more virtual machines implemented in a hosted computing environment. The hosted computing environment may include one or more rapidly provisioned and released computing resources, which computing resources may include computing, networking, and/or storage devices. A hosted computing environment may also be referred to as a cloud computing environment or distributed computing environment. In some examples, the computing device 16 may be in communication with the tool-agnostic device 4 via the network 14. The computing device 16 may include one or more servers, perhaps arranged in a cluster or as individual servers not associated with one another.

In one illustrative configuration, the computing device 16 may include at least one memory 34 and one or more processing units or processors(s) 36. The processor(s) 36 may be implemented as appropriate in hardware, computer-executable instructions, firmware, or combinations thereof. Computer-executable instruction or firmware implementations of the processor(s) 36 may include computer-executable or machine-executable instructions written in any suitable programming language to perform the various functions described when executed by a hardware computing device, such as a processor 36. The memory 34 may store program instructions that are loadable and executable on the processor(s) 36, as well as data generated during the execution of these programs. Depending on the configuration and type of the computing device 16, the memory 34 may be volatile (such as RAM) and/or non-volatile (such as ROM, flash memory, etc.). The computing device 16 may also include additional storage 38, which may include removable storage and/or non-removable storage. The additional storage 38 may include, but is not limited to, magnetic storage, optical disks and/or tape storage. The disk drives and their associated computer-readable media may provide non-volatile storage of computer-readable instructions, data structures, program modules, and other data for the computing devices. In some implementations, the memory 34 may include multiple different types of memory, such as SRAM, DRAM, or ROM.

The memory 34, the additional storage 38, both removable and non-removable, are all examples of non-transitory computer-readable storage media. For example, computer-readable storage media may include volatile or non-volatile, removable or non-removable media implemented in any method or technology for storage of information such as computer-readable instructions, data structures, program modules, or other data. The memory 34 and the additional storage 38 are all examples of non-transitory computer storage media. Additional types of non-transitory computer storage media that may be present in the computing device 16 may include, but are not limited to, PRAM, SRAM, DRAM, RAM, ROM, EEPROM, flash memory or other memory technology, CD-ROM, DVD or other optical storage, magnetic cassettes, magnetic tape, magnetic disk storage or other magnetic storage devices, or any other medium which can be used to store the desired information and which can be accessed by the computing device 16. Combinations of any of the above should also be included within the scope of non-transitory computer-readable media.

The computing device 16 and/or the processor 36 may store program instructions that are loadable and executable on one or more processor(s) 36, as well as data gathered or received from the tool-agnostic device 4 from the sensors 8, 10, 12, and 42, and data generated during the execution of these programs. Turning to the contents of the memory 34 in more detail, the memory 34 may include an operating system and one or more modules for implementing the features disclosed herein including at least a location module 20, an orientation module 22, a state module 24 a VR module 26, and/or a tool-type module 40. The modules can be software, hardware, or a combination of software and hardware. The location module 20 is configured to receive sensed data from the location sensor 8 and provide various functions and operations described herein, including determining the location of the handheld tool 2. The orientation module 22 is configured to receive sensed data from the orientation sensor 10 and provide various functions and operations described herein, including determining the orientation of the handheld tool 2. The state module 24 may be configured to receive sensor data from the state sensor 12 and provide various function and operations described herein, including determining speed, use, settings, and other state parameters of the handheld tool 2. The VR module 26 is configured to receive data and information from other modules and provide various functions including generating, displaying, and/or altering a VR system. The tool-type module 40 is configured to receive data from the tool-type sensor 42 and provide various functions and operations described herein including identifying what type or variety of tool the handheld tool 2 is used with the tool-agnostic device 4. In some embodiments, one or more other modules may receive an indication of a type or category into which the handheld tool falls into from the tool-type module 40 and may process other information received from the tool-agnostic device 4 differently based on that type or category.

In some examples, the VR module 26 may manage the integration of content from one or more sources and present the integrated content to one or more users who are using or wearing immersive devices. In one example, an immersive device may be a pair of AR glasses. In such an instance, content may be displayed over a display of the AR glasses and integrated with the physical environment viewable through translucent or substantially transparent portions of the AR glasses display. In another aspect, an immersive device may be a set of virtual reality goggles, a mobile device, or a computing device (e.g., laptop computer, tablet device, smartphone, smart television, etc.) In some examples, a camera of the virtual reality goggles, mobile device, or computing device may capture images (e.g., video frames) of the surrounding physical environment. The images may be integrated with content obtained by the virtual reality system. The resulting integrated images may then be presented to a user via a display of the virtual reality goggles, computing device, or mobile device, as is described in more detail below.

In some examples, the tool-agnostic device 4 may communicate with a server or other computing device via the network 14 and facilitate generation of an immersive content presentation system, such as a virtual reality environment including the handheld power tool using the VR module 26. For example, immersive content (e.g., virtual reality content, mixed reality content, augmented reality content, etc.) regarding the handheld power tool may be presented to a user wearing or holding an immersive device (e.g., virtual reality [VR goggles], or augmented reality [AR glasses, tablets, smartphones, etc.]). Such immersive content can include information provided by the tool-agnostic device.

The modules 20, 22, 24, and 26 may perform operations or methods with respect to the tool-agnostic device 4 including data gathering steps, where the tool-agnostic device 4 gathers data about the handheld tool 2 from the sensors 8, 10, 12 and 42 contained within the tool-agnostic device 4, or the sensor 30 built on to the tool-agnostic device 4. The tool-agnostic device 4 may then relay the data or information gathered by the various sensors and data collection devices to the computing device 16 and more specifically to the modules 20, 22, 24, and 26. The computing device 16 may process the data from sensors 8, 10, 12, and 42 using the modules 20, 22, 24, 26, and 40 and other information gathered from the tool-agnostic device 4, in some cases in addition to data input by a user, to determine a state and a tool location. The tool location data gathered by the location sensor 8 may include both a physical location and an orientation of the handheld tool 2. The state may indicate, for example, a motor speed or a current drawn by a motor or device of the handheld tool 2 and be processed by the state module. In some instances, the VR module 26 may either generate a VR signal based on the state and the tool location, as well as other inputs, or the VR module 26 may communicate the information to a separate computing device for processing in relation to a VR system. The VR system may be altered based on the data from the sensors 8, 10, 12, and 42 and may additionally provide information or data to a user of the VR system through the VR system.

In some examples of the disclosure, a system including the tool-agnostic device 4 may be used as a teaching or coaching tool. In such an example, the tool-agnostic device 4 may be connected with a handheld tool 2, and configured to communicate with the VR module 26 according to some examples herein. The tool-agnostic device 4 may gather data relating to a location and/or orientation of the handheld tool 2 and communicate with a VR system to display and communicate with a user relating to how the handheld tool 2 is being used. In some examples, a VR environment may be used to teach or coach a user in using the handheld tool 2 for particular tasks. For example, a user may wish to learn to properly drive a screw. As the user manipulates a drill motor equipped with a tool-agnostic device 4, the VR system may be able to guide the user in proper placement of the drill motor and driver head in relation to the screw head and the environment. The system may also detect whether the user is handling the drill motor properly (e.g., holding the drill motor level and using an appropriate speed setting) and may provide a notification (e.g., audio or visual notice) to the user. In some embodiments, notification may alert a user by providing a warning signal. A warning signal may include an audible warning such as a siren, tone, or an intermittent tone as well as a visual signal such as a warning light, notification in a VR environment, or error message.

In some examples, the tool-agnostic device 4 functions as a safety shut-off device and the memory 34 may include a safety module 44 to implement safety procedures. In such examples, the tool-agnostic device 4 contains various state sensors 12 as described above. The tool-agnostic device 4 may also contain a computing device 16. In this example, the safety module 44 may perform processing steps and evaluation steps based on the data received from the state sensor 12 and other sensors to determine whether or not the handheld tool 2 is operating in a first or a second operating condition, or some other operating condition. Some operating conditions may indicate normal, typical safe operation of the handheld tool 2. Some other operating conditions may indicate unsafe or atypical operation of the handheld tool 2. In some operating conditions, the safety module 44 may determine, based on the data gathered by the state sensors 12 or by other information, that power to the handheld tool 2 should be disconnected for safety. For example, in the scenario that the safety module 44 detects that the handheld tool 2 is being operated in a powered state and that the location/orientation data indicates erratic movement of the handheld tool 2 (e.g., movement in location and/or position that exceeds some predetermined safety threshold). In this example, the safety module 44 may be configured to stop the flow of current from the battery to the handheld tool 2. In some embodiments, a safety threshold may vary based on a type of tool onto which the device is attached. For example, safety thresholds may be more stringent when using a power saw than they are when using a drill motor.

In some embodiments, the safety module may be configured to determine whether the handheld tool is operating in a first condition or a second condition, such as a safe state and an unsafe state. The safety module may determine the handheld tool is operating in a safe state when the data, such as usage data, state data, position data, or other data described herein is beneath or below a threshold safety value. The safety module may likewise determine the handheld tool is operating in an unsafe state when the data such as usage data, state data, position data, or other data described herein is above or over a threshold safety value. The threshold safety value may be predetermined and/or adaptive as described below.

Some methods performed with respect to the tool-agnostic device 4 as a safety device include steps such as gathering information about the handheld tool 2 from the sensors 8, 10, 12, and 42, and alternately gathering information relating to a handheld tool type based on a user input. The safety module 44 may be configured to determine whether a handheld tool 2 is operated safely or unsafely. If the safety module 44 determines that the handheld tool 2 is operating safely, the tool-agnostic device 4 may continue to relay electrical power from a removable battery to the handheld tool 2. If the safety module 44 determines that the handheld tool 2 is operating in an unsafe condition, based at least in part on the information gathered by the sensors 8, 10, 12 and 42, then the tool-agnostic device 4 may disconnect or the safety module 44 may send a signal or instruction to disconnect or otherwise stop a flow of electricity from a removable battery 6 to the handheld tool 2.

Figure 2:
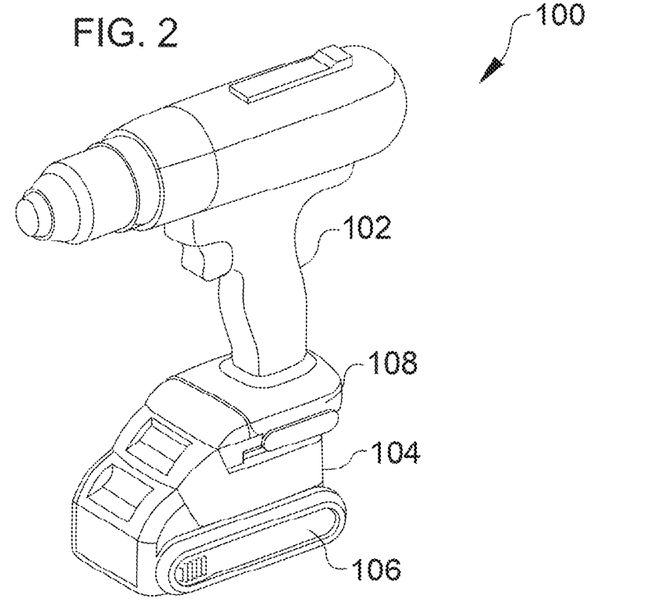
FIG. 2 depicts a perspective view of a handheld tool assembled with an example of a tool-agnostic device.
Figure 3:
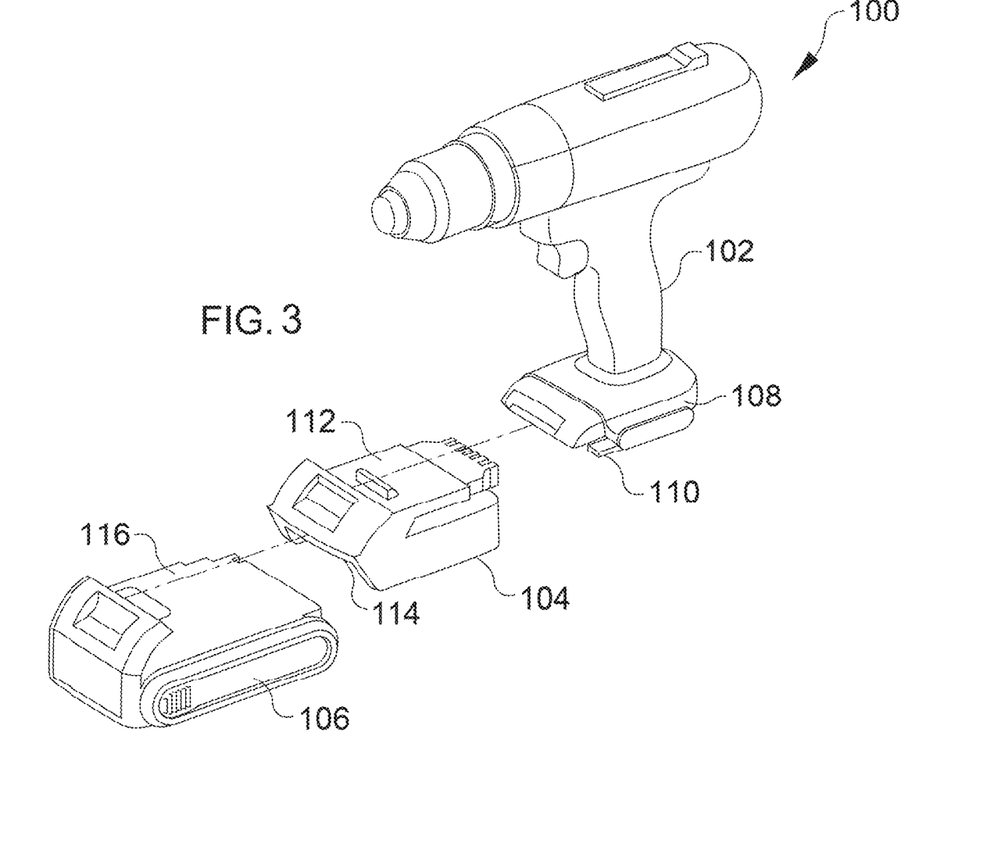
FIG. 3 depicts an exploded perspective view showing assembly of the handheld tool of FIG. 2 with the tool-agnostic device.

FIGS. 2 and 3 show an example system 100 including a handheld tool 102 with a tool-agnostic device 104 installed for use according to any of the examples of the disclosure. In particular, in FIG. 2, the handheld tool 102 is shown as a cordless drill/driver. At a lower end of the handheld tool 102 is the battery port 108. The battery port 108 is configured to receive and retain a removable battery 106. In the example system 100, the tool-agnostic device 104 is inserted into the battery port 108 of the handheld tool 102. The removable battery 106, which is still necessary for the handheld tool 102 to operate, is connected to the tool-agnostic device 104 at a lower end of the tool-agnostic device 104. In such a configuration, the removable battery 106, the tool-agnostic device 104, and the battery port 108 of the handheld tool 102 are all electrically connected in series with the tool-agnostic device 104 located in between the removable battery 106 and the battery port 108. With the tool-agnostic device 104 in this location, the tool-agnostic device 104 is able to interrupt the electrical connection between the removable battery 106 and the battery port 108. Additionally, this allows the tool-agnostic device 104 to include sensors such as current sensors to directly measure the current drawn by the handheld tool 102 from the removable battery 106. In some examples, the tool-agnostic device 104 and the removable battery 106 may be combined or housed in a single unit. For example, the removable battery 106 may be built with the sensors 8, 10, 12, 42, transmitter 28, and other components of the tool-agnostic device 104.

FIG. 3 shows an exploded view of the example system 100 with a handheld tool 102, tool-agnostic device 104, and removable battery 106. The exploded view of FIG. 3 shows how the tool-agnostic device 104 is connected to the handheld tool 102 and the removable battery 106. At a lower end of the battery port 108 is a battery attachment mechanism 110 which is configured to securely hold and release a removable battery 106. The tool-agnostic device 104 includes an upper securing surface 112 which is configured to releasably attach to the battery attachment mechanism 110 and also provides an electrical connection to the battery port 108. The lower surface of the tool-agnostic device includes a battery securing mechanism 114 which has a structure similar, if not identical, to the battery attachment mechanism 110. The removable battery 106 has an upper attachment surface 116 shaped and configured to attach to and secure to the battery attachment mechanism 110 as well as the battery securing mechanism 114 of the tool-agnostic device.

To assemble the example system 100, the tool-agnostic device 104 is inserted or slid into place in the battery port 108, with the battery attachment mechanism 110 securing the upper securing surface 112 of the tool-agnostic device 104. The removable battery is also inserted or slid into place in the battery securing mechanism 114 of the tool-agnostic device 104. The upper attachment surface 116 of the removable battery 106 is mated with and secured to the battery securing mechanism 114 of the tool-agnostic device 104. In some examples, the removable battery 106 may be inserted into the tool-agnostic device 104 before the tool-agnostic device 104 is inserted into the battery port 108. In other examples the order of attachment may differ.

Figure 4:
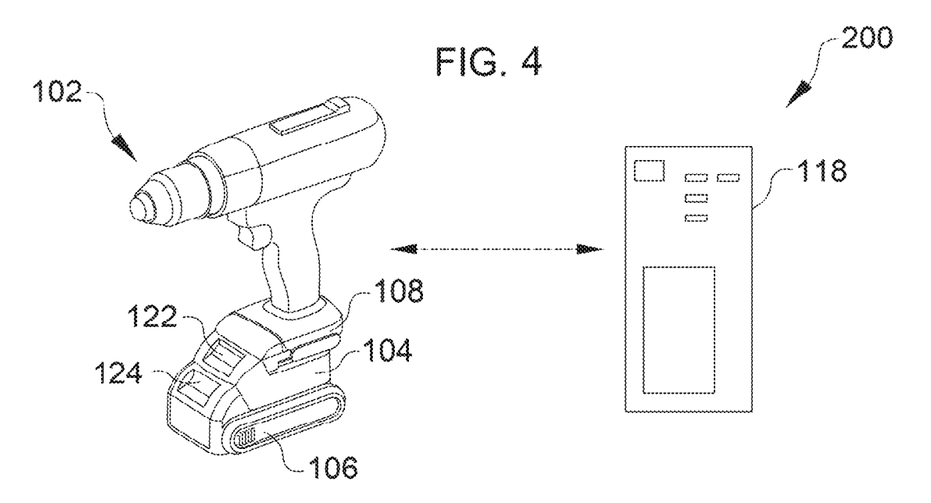
FIG. 4 depicts an illustration of a system for operating the tool-agnostic device.

FIG. 4 shows a system 200 according to examples of the disclosure. The system includes a handheld tool 102 and a computing device 118. The handheld tool 102 includes several different components, including a tool-agnostic device 104 and a removable battery 106. In the example shown in FIG. 2, the handheld tool 102 is shown as a cordless drill, though other handheld tools which use a removable battery may be used as well. In the battery port 108 of the handheld tool 102, the tool-agnostic device 104 is inserted and secured using a latching mechanism 122 typically used to secure a removable battery in place. The tool-agnostic device 104 is coupled to the handheld tool 102 on an upper end while the lower end of the tool-agnostic device couples to a removable battery 106. The removable battery 106 is secured to the bottom end of the tool-agnostic device 104 with a latching mechanism 124, normally used to secure the battery into the battery port 108 of the handheld tool 102.

In the system 200, the computing device 118 may be communicatively coupled to the tool-agnostic device via a wireless communication, such as Bluetooth, or any other wireless communication system. In some examples, the tool-agnostic device 104 may communicate data gathered by a sensing system or various sensors to the computing device 118. The computing device may be configured to perform methods and process the data gathered by the sensors of the tool-agnostic device for use by other systems or by the system 200.

The tool-agnostic device 104 may be configured to function as a safety feature for the handheld tool 102. In such a configuration, the handheld tool 102 with the tool-agnostic device 104 installed, as described herein, may be used by a user for any purpose, such as cutting, drilling, routing, or other power tool operations. During operation of the handheld tool 102, sensors within the tool-agnostic device 104 may collect data as described above. The tool-agnostic device 104 may relay the data from the sensors to the computing device 118 using the network and/or a transmitter as described earlier. The computing device 118 may interpret and process the data from the sensors using modules as described above to determine whether the user is operating the tool in a safe manner. If the computing device 118 determines, based on the data from the tool-agnostic device 104, that the tool is operating in an unsafe manner, then the computing device 118 may send a signal to the tool-agnostic device 104 to cause it to take some preventative action. For example, the signal may instruct the tool-agnostic device 104 to electrically disconnect or interrupt the electrical connection between the handheld tool 102 and the removable battery 106. In another example, the signal may instruct the tool-agnostic device 104 or a VR system to provide a notification to the user. A notification may be an audio notification or a visual (displayed) notification. For example, a notification may include a message or augmentation displayed upon a display screen of the VR system.

In another example, the tool-agnostic device 104 and/or a safety module associated with the tool-agnostic device 104 may electrically disconnect the connection between the handheld tool 102 and the removable battery 106 when a safety device (not shown), such as a guard on a portable band saw is not engaged. If the safety device, which may be built in to the handheld tool 102 or be a modification, is not engaged or disengages during operation, the safety module and/or the tool-agnostic device may instruct, cause, or directly electrically disconnect the handheld tool 102 from the removable battery 106. The safety device may be outfitted with external sensors to sense or detect engagement or use of the safety device. In some other instances, the safety device may have built in sensors within the handheld tool configured to communicate with the tool-agnostic device 104 and provide information relating to the use or engagement of safety devices or safety features.

The system 200 may also be configured as a VR system configured to display the use and control of the handheld tool 102. In the system 200, the tool-agnostic device 104 may contain or include sensors as described herein to track performance and location of the handheld tool 102. The computing device 118, including the VR module 26, in communication with the tool-agnostic device 104, may also serve or be configured to present a VR display or be a portion of a VR system. In such a system 200, the user may operate the handheld tool 102 in a VR environment and be presented with instructions, teaching, safety, or other notifications and direction. In some examples, the system 200 may be configured to teach a user how to perform certain tasks, such as driving a screw, or more complex tasks such as a remodeling or renovation project. The system 200 may also be configured to instruct a user to switch between different tools, meaning to remove the tool-agnostic device 104 from a handheld tool 102 and insert or connect the tool-agnostic device to a second handheld tool (not shown). This may all be part of a complex VR system or environment teaching a user various tasks requiring multiple tools.

Figure 5:
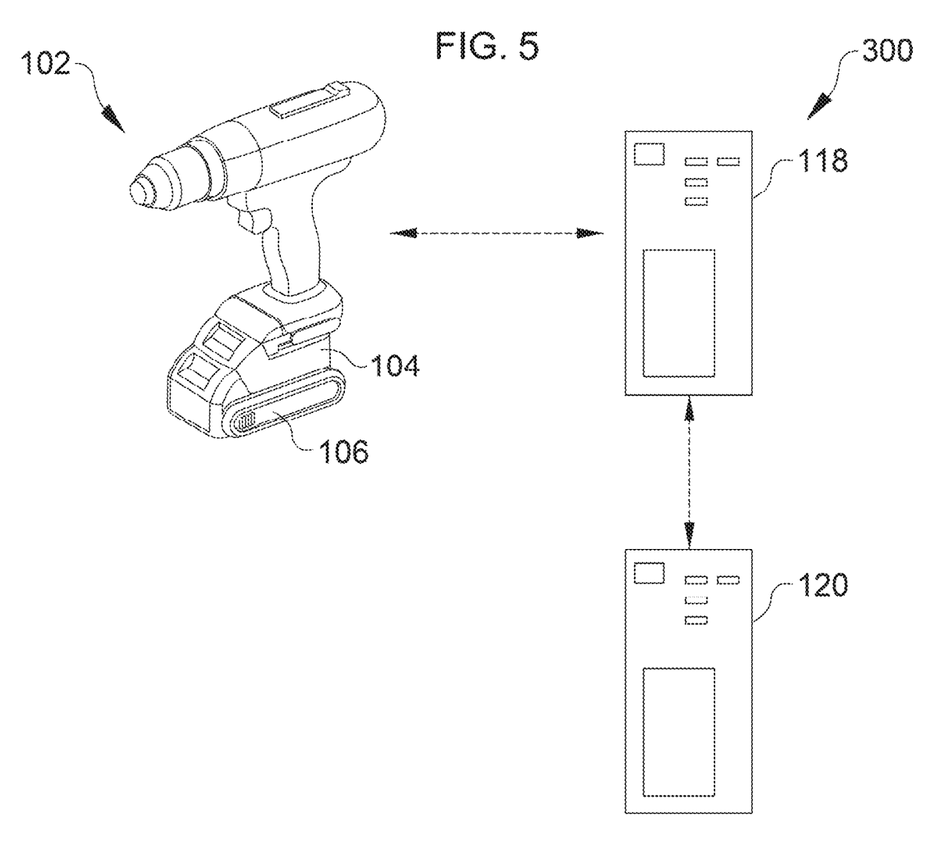
FIG. 5 depicts an illustration of a system for operating the tool-agnostic device in communication with a virtual reality system.

FIG. 5 is a system 300 that configured to perform a number of operations with the tool-agnostic device 104. The system 300 includes a handheld tool 102, a computing device 118, and a second computing device 120. The system 300 also includes a tool-agnostic device 104 connected to both the handheld tool 102 and a removable battery 106. The tool-agnostic device 104 may be configured to collect data relating to the state, location, and/or type of handheld tool as described above. The tool-agnostic device 104 is communicatively coupled to the computing device 118, using any suitable communication system described above. The computing device 118 is likewise communicatively coupled to, or in communication with, the second computing device 120 and may connect or communicate over the network 14.

The computing device 118 receives data from the tool-agnostic device 104 and, using the VR module 26, generates a signal based on the data collected. The signal contains information related to a use of the handheld tool 102 and may also include information such as whether the tool is operating in a safe manner. The computing device 118 may, in some cases, relay information or signals to the second computing device 120 over the network 14. The second computing device 120 is used to generate, alter, and manipulate a VR system and may be in communication with a number of user interaction devices such as VR goggles, displays handsets, gloves, or any user interaction device for a VR system. The signal sent from the computing device 118 to the second computing device 120 may also include instructions or data to aid the second computing device 120 in making, manipulating, altering, or displaying the handheld tool 102 in the VR environment.

Figure 6:
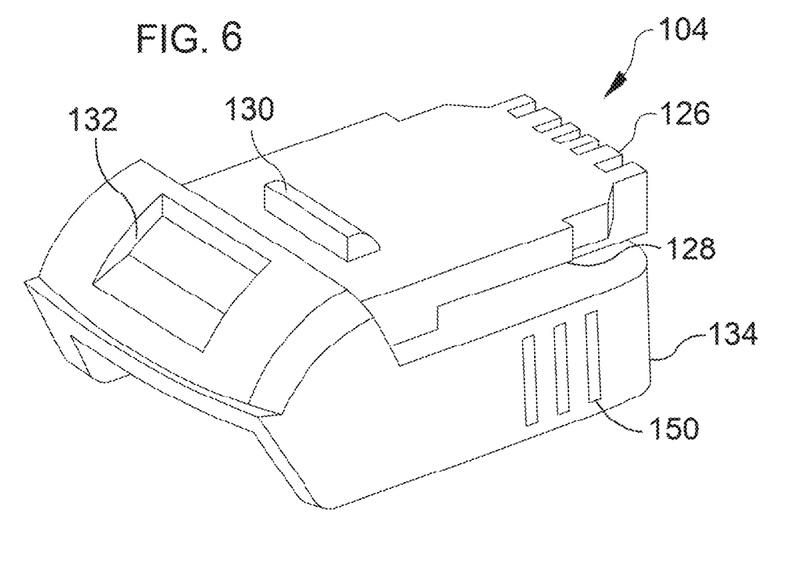
FIG. 6 depicts a top, perspective view of the tool-agnostic device of FIG. 2.
Figure 7:
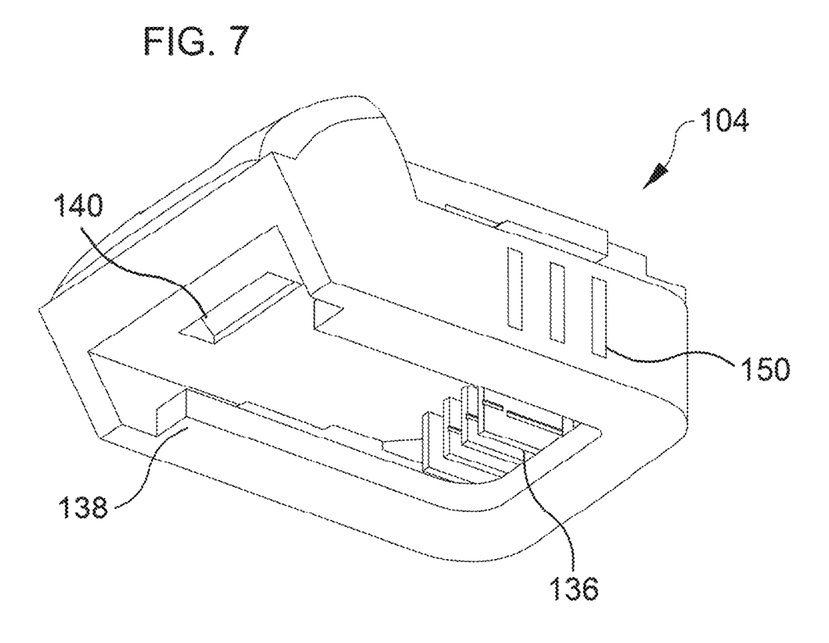
FIG. 7 depicts a bottom perspective view of the tool-agnostic device of FIG. 2.

FIG. 6 shows an upper perspective view of an example of a tool-agnostic device 104 according to the disclosure. The example shown in FIGS. 6-7 is configured to interface with a particular style or design of removable battery port for a handheld tool system. The particular example of the tool-agnostic device 104 shown in FIG. 6 has several upper surfaces configured to interface with a battery port of a handheld tool. For example, electrical connectors 126 are shaped and design to interface with and electrically connect to a number of electrical connections within the battery port of the handheld tool. Along the lateral sides of the tool-agnostic device 104 are guides 128 which serve to slide into guide members of a battery port. The guides 128 are shaped to imitate similar guides on a removable battery. The tool-agnostic device 104 may be secured into the battery port of the handheld tool using a latch. In the example shown, the latch includes a latching member 130 shaped and configured to secure into a channel or slot of the battery port when the tool-agnostic device 104 is inserted into the battery port. The latching member 130 removably secures the tool-agnostic device 104 in place. A latch release 132 may engage or disengage the latching member 130 and allow the tool-agnostic device 104 to be inserted or removed from the battery port. When the latching member 130 is engaged, the tool-agnostic device 104 is secured into the battery port. The specific shape and geometry of the tool-agnostic device 104 may be adapted and altered from the example shown to match or imitate a shape or geometry of a removable battery intended for use with the handheld tool. While the specific geometry may differ, the importance of the shape of the tool-agnostic device 104 is that it must be capable of engaging with, electrically connecting to, and disengaging from the battery port of the handheld tool.

The tool-agnostic device 104 includes a housing 134 which may be a rigid plastic, such as PVC, ABS, or any other suitable plastic. The housing 134 encloses an internal space which holds or contains a number of sensors, devices, and electrical connections as described above.

In some embodiments, the tool-agnostic device 104 includes expansion slots 150 for adding sensors or components to expand the capabilities of the tool-agnostic device 104. Additional sensors (not shown) may be plugged into the expansion slots 150 and provide additional functionality. Any sensors described herein, as well as other well-known sensors may be added to provide functionality for any particular application with respect to the tool-agnostic device 104. For example, an additional sensor for sensing local temperature may be inserted into the expansion slots 150 for situations where a user may need information relating to a temperature at or around the handheld tool 102. In some embodiments, the expansion slots may provide additional functionality or software modules rather than sensors. For example, additional modules and/or sensor for identifying attachments to the handheld tool 102 such as a drill bit or cutter head may be inserted into the expansion slots 150.

In addition, the tool-agnostic device 104 may be configured to communicate with additional sensors located outside the housing 134, including sensors connected to external devices or to the handheld tool or components thereof. Additional non-limiting examples of sensors which may be in communication with the tool-agnostic device 104 include force sensors, pressure transducers, shock sensors, strain gauges, strain sensors, temperature sensors, rotary position sensors, magnetic rotary position sensors, angular sensors, magnetic angular sensors, or any other sensing device capable of detecting motion, force, electrical properties, or any changing property.

FIG. 7 shows a second perspective view of a tool-agnostic device 104. The underside or lower side of the tool-agnostic device 104 is shown. The underside, or side opposite the view of FIG. 6 is configured to receive a connection point of a removable battery. The tool-agnostic device 104 comprises a number of structures and features designed to interface with the removable battery. In some examples, the underside of the tool-agnostic device 104 should resemble the battery port of the handheld tool. In the particular example shown in FIG. 7, the structure includes a number of fins or pins 136 containing electrodes and designed to interface with matching electrodes on the removable battery. A guide or ledge 138 is designed to serve as an insertion rail, on which a guide or rail of the removable battery may slide as the removable battery is inserted or removed from the tool-agnostic device 104. A slot 140 or groove is configured to receive a latching member of the removable battery to secure the battery in position when inserted. As described above, the specific structure of the tool-agnostic device 104 may vary or differ, but should, in any case, have an upper mating surface or connection which is substantially identical to a mating surface or connection of a removable battery and have a lower mating surface or connection which is substantially identical to a mating surface or connection of a battery port in the handheld tool.

Figure 8:
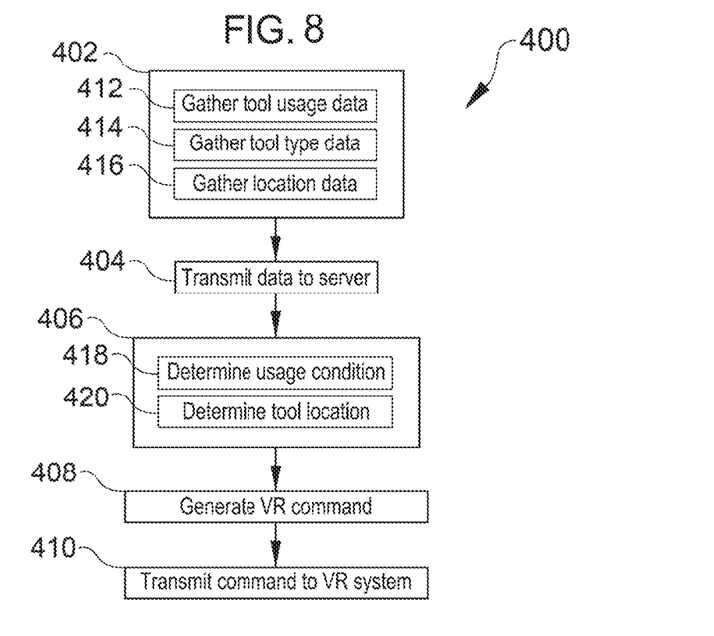
FIG. 8 depicts a flow diagram illustrating a process for operating the tool-agnostic device in coordination with a virtual reality system.

FIG. 8 shows a process 400 that may be carried out by examples of the disclosure. The process 400 includes the use of the VR system, the handheld tool, the tool-agnostic device, and one or more computing devices including one or more modules described earlier. Beginning at block 402, the tool-agnostic device may use an array of sensors such as the location sensor 8, orientation sensor 10, state sensor 12, and/or the tool-type sensor 42 to gather data, such as tool usage data 412 and tool location data 414. Tool usage data 412 may include information such as current drawn from the removable battery and accelerometer or vibration sensor data. Tool location data 414 is gathered by the location sensor 8 and/or the orientation sensor 10 and may include position and orientation data associated with the handheld tool. Tool type data 416 is also gathered, at least initially, either by a user input device or by the tool-type sensor 42. At block 404, the data gathered by the sensors 8, 10, 12, and 42 and/or the user input device is conveyed to the computing device 16 by the transmitter 28. At block 408, the computing device 16 receives the data from the tool-agnostic device 4 and modules, such as those described above, contained on the memory 34 perform operations or processes with the data. The data processing steps carried out by the modules 20, 22, 24, 26, 40, and 44 include determining a state 418 and determining a tool location 420. The tool location 420 determination may include the relative position, orientation, proximity, or other positional-type data of the handheld tool 2 in a space. In some examples the location data may be collected in reference to elements of the VR system or environment. The state 418 determination may include determining a speed of a motor, whether a switch is on/off, whether the tool is in reverse, or any other tool settings or operating conditions. At block 408, the state 418 determination and the tool location 420 determination are used, at least in part by the VR module 26, to generate a command or signal to communicate with a VR system. The signal or command may include altering the VR environment based on the data processing blocks 406. The VR command generated at 408 may be generated by a module on a second computing device, or may be generated by the first computing device and the VR module 26 and sent to a second computing device, or in some examples, may remain with a first computing device which also produces the VR system. At block 410, the command from block 408 is transmitted for use with a VR system. The VR system may be altered to show a changing handheld tool location or use.

Figure 9:
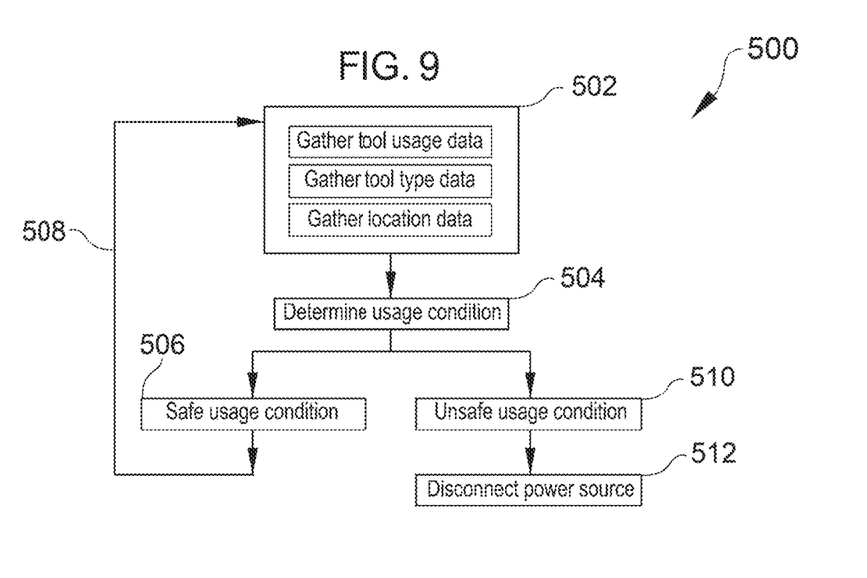
FIG. 9 depicts a flow diagram illustrating a process for the tool-agnostic device to increase handheld tool usage safety.

FIG. 9 shows a process 500 or method for implementing a safety shut-off feature for a handheld tool 2 using a tool-agnostic device 4. The process 500 involves using sensors, such as those described herein, of a tool-agnostic device 4 to determine a safe/unsafe operating condition and disconnect power to the handheld tool 2 when the unsafe operating condition is determined or detected. The process 500 begins by gathering data using the sensors of the tool-agnostic device at step 502. The data may include state data, location data, tool type data, or any other data according to the disclosure. At step 504 a safety module 44 determines, based on the data collected at step 502, whether the tool is operating in a safe or unsafe condition. In some embodiments, one or more safety thresholds may be used to identify safe/unsafe conditions. For example, state data may be used to determine a safety threshold associated with an operating state of the handheld tool. The safety threshold may represent a maximum change in location and/or orientation for the tool in that operating state. Information related to the position of the handheld tool may then be compared to the safety threshold to determine whether the tool is being operated in a safe or unsafe mode by determining whether a change in position with respect to time exceeds the safety threshold.

If the safety module 44 determines the handheld tool 2 is operating in a safe condition the process proceeds to step 506 and on to step 508. At step 508, the electrical connection for the handheld tool is left undisturbed and the process 500 begins again at step 502. The process 500 may be iterative or a continuous process. If, at step 504, the safety module 44 determines the handheld tool 2 is operating in an unsafe manner, then the process 500 proceeds to step 510, and subsequently on to step 512 where the tool-agnostic device 4 disconnects the power source from the handheld tool 2. The safety module 44 may generate a signal instructing the tool-agnostic device 4 to perform a disconnect operation electrically disconnecting a power source such as a removable battery 6 from the handheld tool 2. The tool-agnostic device 4 may include internal switches or circuitry to disconnect the power or flow of electricity to the handheld tool 2 without physically disconnecting the power source or removable battery 6.

In some instances, step 504 may include the safety module 44 determining that data gathered in step 502 exceeds a predetermined "safe" threshold. In some instances, the threshold may be a scalar quantity intended to represent a sum total of various data points compiled together according to an algorithm. Data collected by the tool-type sensor 42 and processed by the tool-type module or data collected in step 502 may also impact the threshold required to determine an unsafe state. For example, determining that the tool-agnostic device 4 is connected to one type of handheld tool 2 such as a router or circular saw may have a higher or lower shutoff threshold than a threshold shutoff when the tool-agnostic device 4 is installed on a power drill.

The predetermined threshold described above may be set in advance, be tool-type specific, and/or may be adaptable based on handheld tool usage or state. In some instances, the predetermined safety threshold may be a setting adjustable by a user via the computing device and/or the safety module described above. The threshold may automatically adjust based on the information or data sensed by the tool-type sensor. For example, when the tool-type sensor senses a cordless drill the threshold may be a first value X and when the tool-type sensor senses an angle grinder the threshold may be set to a second value Y. The values X and Y may differ or be identical. The tool-type determination may trigger or cause the threshold value to automatically be adjusted by the safety module.

In some examples, the threshold value may vary based on data gathered by the state sensor. In one illustrative example, a user may operate a cordless drill motor at a low speed and a high speed. At the low speed, the state sensor and/or state module may determine the motor is spinning or turning at a relatively low speed and communicate with the safety module. The safety module may adjust the safety threshold to a higher or lower value. Upon the user operating the drill motor at high speed, the safety module may adjust the safety threshold either higher or lower. In one embodiment, the safety threshold at low drill motor speed may be higher than the safety threshold at high drill motor speed. In another embodiment, the safety threshold at high drill motor speed may be higher than the safety threshold at low drill motor speed.

Figure 10:
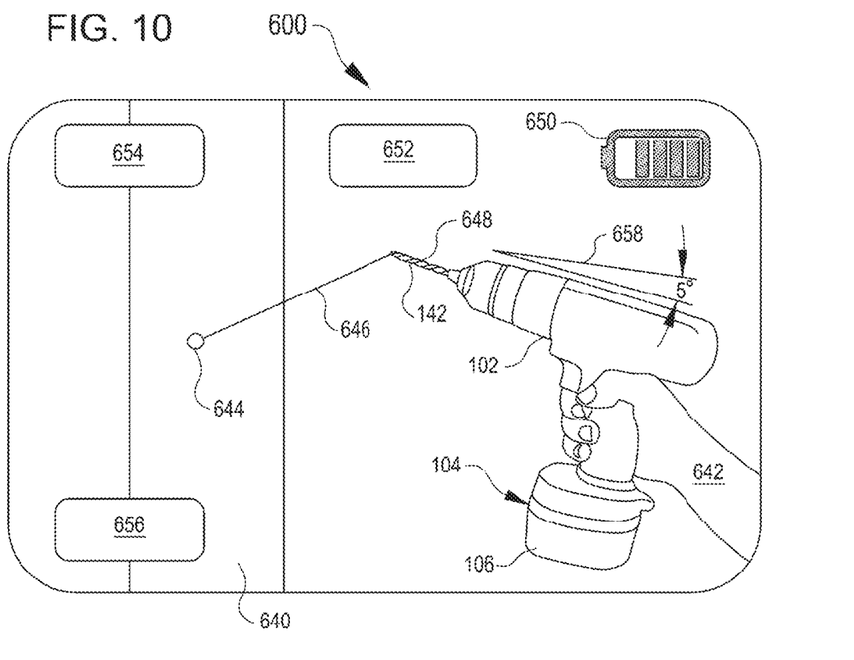
FIG. 10 depicts an illustration of a virtual reality environment operated in coordination with a tool-agnostic device.

FIG. 10 shows an illustration of an example VR environment 600 incorporating the tool-agnostic device 104 to augment a user's view or display. The user 642 may be wearing VR goggles or AR goggles as described earlier to produce the VR environment 600. The VR environment includes displays of real-life objects such as the handheld tool 102, tool-agnostic device 104, battery 106, and an work piece 640 that is the target of the user's work with the handheld tool 102. The VR environment 600 includes display elements overlaid on the real-life elements including a battery indicator 650, tool orientation or tilt indication 658, tool attachment identification 648, and other displays 652, 654, and 656. The other displays 652, 654, and 656 may display information relating to data gathered by sensors within the tool-agnostic device 104 or may display information associated with modules or applications described herein. For example, the displays may include a motor speed, whether a safety device is enabled, a signal strength for the communication devices, or other features. For example, one or more sensors may detect the presence of a safety device. In this example, the user may be provided with a visual notification that the safety device is attached and/or a safety threshold may be adjusted to account for the presence of the safety device.

In some embodiments, the VR environment 600 may be configured to display instructional information, such as guides 646 instructing a user 642 to place a part of the handheld tool 102 or attachment 142 in a location 644 on a work piece 640. The VR environment 600 may also include instructions, either in one of the other displays 652, 654, and 656 or in other locations in the VR environment 600 for the user 642 to tilt the handheld tool 102 and/or to increase or decrease a motor speed or other operating parameter of the handheld tool 102.

In some embodiments, image information captured via an AR system implementation (e.g., a type of VR system) may be processed to determine one or more attributes/states of the handheld tool. For example, in the case that the handheld tool is a drill motor, the system may use item recognition to identify the tool type as being a drill motor. In this same example, the system may use other collected data (e.g., depth sensor data) to determine that the drill motor is currently fitted with a particular size drill bit. In some embodiments, the AR system may augment the display screen to include at least some of this information.

The various examples further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Most examples utilize at least one network that would be familiar to those skilled in the art for supporting communications using any of a variety of commercially-available protocols, such as Transmission Control Protocol/Internet Protocol ("TCP/IP"), Open System Interconnection ("OSI"), File Transfer Protocol ("FTP"), Universal Plug and Play ("UpnP"), Network File System ("NFS"), Common Internet File System ("CIFS"), and AppleTalk. The network can be, for example, a local area network, a wide-area network, a virtual private network, the Internet, an intranet, an extranet, a public switched telephone network, an infrared network, a wireless network, and any combination thereof.

In examples utilizing a Web server, the Web server can run any of a variety of server or mid-tier applications, including Hypertext Transfer Protocol ("HTTP") servers, FTP servers, Common Gateway Interface ("CGI") servers, data servers, Java servers, and business application servers. The server(s) also may be capable of executing programs or scripts in response to requests from user devices, such as by executing one or more Web applications that may be implemented as one or more scripts or programs written in any programming language, such as Java®, C, C#, or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of examples, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired)), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate examples may have numerous variations from that described above. For example, customized hardware might also be used and/or particular elements might be implemented in hardware, software (including portable software, such as applets), or both. Further, connection to other computing devices such as network input/output devices may be employed.

Storage media computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory ("EEPROM"), flash memory or other memory technology, Compact Disc Read-Only Memory ("CD-ROM"), digital versatile disk (DVD), or other optical storage, magnetic cassettes, magnetic tape, magnetic disk storage, or other magnetic storage devices, or any other medium which can be used to store the desired information and which can be accessed by a system device. Based on the disclosure and teachings provided herein, a person of ordinary skill in the art will appreciate other ways and/or methods to implement the various examples.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated examples thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed examples (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate examples of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain examples require at least one of X, at least one of Y, or at least one of Z to each be present.

Preferred examples of this disclosure are described herein, including the best mode known to the inventors for carrying out the disclosure. Variations of those preferred examples may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A tool-agnostic device comprising:
   a body configured to interface with both a removable battery of a set of handheld tools and a battery port of the set of handheld tools and electrically connect the removable battery to the battery port of a handheld tool, the handheld tool being of a first handheld tool type, the set of handheld tools including the handheld tool of the first handheld tool type and a second handheld tool of a second handheld tool type that is different than the first handheld tool type;
   a first sensor configured to collect a first data set relating to at least (i) a position of the handheld tool and (ii) an orientation of the handheld tool;
   a second sensor configured to collect a second data set including state data and relating to a state of the handheld tool; and
   a communication device configured to convey the first data set and the second data set to a computing device configured to generate or alter immersive content based at least in part on the first data set and responsive to the first data set or the state data, the first data set and the second data set being interpretable by the computing device in a manner specific to the first handheld tool type electrically connected to the body and different from at least the second handheld tool type.

2. The tool-agnostic device of claim 1, wherein the computing device is adapted to at least: (i) receive information from a user identifying the type of handheld tool electrically connected to the body or (ii) determine the type of handheld tool based at least in part on the second data set.

3. The tool-agnostic device of claim 1, wherein the communication device is further configured to provide, to the computing device, an indication of the type of handheld tool electrically connected to the body.

4. The tool-agnostic device of claim 1, wherein the second sensor comprises a current sensor configured to measure an electrical current between the removable battery and the handheld tool.

5. The tool-agnostic device of claim 1, further comprising an accelerometer configured to collect a motion data set relating to a motion of the handheld tool.

6. The tool-agnostic device of claim 5, wherein the communication device is further configured to convey the motion data set to the computing device.

7. A tool-agnostic tracking system comprising:
   a computing device configured to generate or alter immersive content based at least in part on a first data set and responsive to the first data set or state data;
   a handheld tool having a removable battery and a battery port, the handheld tool being of a first handheld tool type included in a set of handheld tool types including one or more additional handheld tool types; and
   a removable tool-agnostic device comprising:
      a first port configured to interface with the battery port;
      a second port configured to interface with the removable battery, wherein the first port and the second port electrically connect the removable battery to the handheld tool when the removable tool-agnostic device is installed on the handheld tool;
      a position sensor configured to collect the first data set relating to at least (i) a position of the handheld tool and (ii) an orientation of the handheld tool;
      a state sensor configured to collect the state data relating to a power usage of the handheld tool; and
      a communication device configured to convey the first data set and the state data to the computing device, wherein the computing device generates a notification based at least in part on the first data set, the state data, and the handheld tool type of the handheld tool.

8. The tool-agnostic tracking system of claim 7, wherein the removable tool-agnostic device further comprises a motion sensor configured to collect tool motion data.

9. The tool-agnostic tracking system of claim 7, wherein the removable tool-agnostic device further comprises at least one of: (i) an identification system configured to identify a handheld tool type and communicate the handheld tool type to the computing device or (ii) a motion sensor configured to collect tool motion data.

10. The tool-agnostic tracking system of claim 9, wherein the identification system comprises an RFID tag reading device.

11. The tool-agnostic tracking system of claim 9, wherein the first port of the removable tool-agnostic device is insertable into the battery port and the removable battery is insertable into the second port.

12. The tool-agnostic tracking system of claim 7, wherein the immersive content includes explanatory information including instructions about performing a task with the handheld tool.

13. The tool-agnostic tracking system of claim 7, wherein the handheld tool comprises one or more sensors configured to collect setting data relating to a setting or configuration of the handheld tool.

14. The tool-agnostic tracking system of claim 7, wherein the removable tool-agnostic device is further configured to identify the first handheld tool type from a set of tool types including one or more additional handheld tool types using at least (i) one sensor of the removable tool-agnostic device and (ii) a sensor data profile, and communicate the first handheld tool type to the computing device.

15. A method of tracking usage of a handheld tool, the method comprising:
   receiving a tool type input indicating a first type of handheld tool being tracked, the first type of handheld tool included in a set of handheld tool types that includes one or more additional handheld tool types;
   receiving a first data set including at least (i) position data and (ii) orientation data from a tool-agnostic device that is connected to a battery port of the handheld tool;
   receiving state data from the tool-agnostic device;
   processing the position data or orientation data, or both the position data and orientation data, and the state data based at least in part on the tool type input indicating the first type of handheld tool to determine a tool state;
   generating a tool tracking signal based at least in part on the tool state; and
   transmitting the first data set and the state data to a computing device configured to generate or alter immersive content based at least in part on the first data set and responsive to the first data set or the state data, the first data set and the state data being interpretable by the computing device in a manner specific to the first type of handheld tool and different from the one or more additional handheld tool types.

16. The method of claim 15, wherein the position data relates to a location of the handheld tool and the orientation data relates to an orientation of the handheld tool.

17. The method of claim 15, wherein the state data relates to a power consumption of the handheld tool.

18. The method of claim 15, wherein the tool state is used to cause the handheld tool to change to a second tool state by at least adjusting a motor speed or battery draw.

19. The method of claim 15, further comprising conveying the tool tracking signal to the computing device configured to display information based on the tool tracking signal in a virtual reality environment.

20. The method of claim 15, wherein processing the position data or orientation data, or both the position data and orientation data, and the state data comprises determining a tool location, orientation, and state of the handheld tool.

\* \* \* \* \*